(12) United States Patent
Freis et al.

(10) Patent No.: US 10,584,727 B2
(45) Date of Patent: Mar. 10, 2020

(54) MULTI-MATERIAL RESTRAINER JOINT

(71) Applicant: Ford Global Technologies, LLC, Dearborn, MI (US)

(72) Inventors: Amanda Kay Freis, Ann Arbor, MI (US); Thomas Norton, Ann Arbor, MI (US); Garret Sankey Huff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 15/343,176

(22) Filed: Nov. 3, 2016

(65) Prior Publication Data
US 2018/0119716 A1 May 3, 2018

(51) Int. Cl.
*F16B 5/04* (2006.01)
*F16B 19/04* (2006.01)
*F16B 21/08* (2006.01)
*B62D 27/02* (2006.01)

(52) U.S. Cl.
CPC .............. *F16B 5/04* (2013.01); *B62D 27/023* (2013.01); *F16B 19/04* (2013.01); *F16B 21/084* (2013.01); *Y10T 403/49* (2015.01); *Y10T 403/75* (2015.01)

(58) Field of Classification Search
CPC .... B62D 27/023; B62D 27/026; B62D 27/04; F16B 5/0084; F16B 5/0088; F16B 5/04; F16B 5/0642; F16B 5/065; F16B 11/006; F16B 19/004; F16B 19/04; F16B 21/084; F16B 21/088; Y10T 403/49; Y10T 403/58; Y10T 403/587; Y10T 403/645; Y10T 403/75

USPC ..... 403/274, 315, 319, 337, 408.1; 411/501, 411/510
See application file for complete search history.

(56) References Cited

U.S. PATENT DOCUMENTS

| | | | | |
|---|---|---|---|---|
| 2,056,036 | A | * | 9/1936 | Catron ..................... H01R 4/52 411/501 |
| 2,378,118 | A | * | 6/1945 | Widrich ................ F16B 19/125 411/501 |
| 3,526,032 | A | * | 9/1970 | Pipher ...................... B21J 15/02 403/274 |
| 5,165,984 | A | | 11/1992 | Schoenthaler |
| 5,468,108 | A | * | 11/1995 | Sullivan ................ F16B 21/084 411/510 |
| 5,651,632 | A | | 7/1997 | Gordon |

(Continued)

OTHER PUBLICATIONS

Jim Camillo, What's New With Screws, Assembly, Feb. 1, 2014.

*Primary Examiner* — Josh Skroupa
(74) *Attorney, Agent, or Firm* — Burris Law, PLLC

(57) ABSTRACT

A fastener for use in joining workpieces, for example automotive body parts such as a roof to a body frame member, is provided that includes a plastically deformable head portion, a platform disposed at a bottom of the head portion, and a distal end portion extending from the platform and defining at least one of elastically deformable locking member. The head portion is heat staked to one workpiece, and the elastically deformable locking member engages another workpiece to secure the workpieces together. The platform provides spacing, or a bond gap in one form, between the workpieces, and a material and geometry of the fastener are configured to compensate for a difference in thermal expansion of the workpieces.

20 Claims, 6 Drawing Sheets

(56) References Cited

U.S. PATENT DOCUMENTS

| | | | | |
|---|---|---|---|---|
| 5,800,109 | A * | 9/1998 | Carruthers | F16B 19/004 |
| | | | | 411/510 |
| 7,658,583 | B2 | 2/2010 | Homner | |
| 7,896,601 | B2 * | 3/2011 | Kalyanadurga | F16B 21/084 |
| | | | | 411/510 |
| 8,029,222 | B2 | 10/2011 | Nitsche | |
| 8,533,919 | B2 * | 9/2013 | Schliessner | F16B 21/084 |
| | | | | 411/510 |
| 9,266,685 | B2 * | 2/2016 | Perron | B23P 19/003 |
| 9,328,754 | B2 * | 5/2016 | Stokes | F16B 5/0692 |
| 9,511,544 | B2 * | 12/2016 | Hemingway | F16B 5/0642 |
| 9,706,659 | B2 * | 7/2017 | Burleson | F16B 5/0642 |
| 9,873,388 | B2 * | 1/2018 | Meyers | B29C 45/16 |
| 2008/0138169 | A1 * | 6/2008 | Jackson | F16B 5/0642 |
| | | | | 411/450 |
| 2014/0041164 | A1 * | 2/2014 | Huelke | F16B 5/065 |
| | | | | 24/458 |
| 2015/0344075 | A1 | 12/2015 | Seo et al. | |
| 2016/0059340 | A1 | 3/2016 | Hill et al. | |
| 2016/0091008 | A1 * | 3/2016 | Cerfeuille | F16B 19/04 |
| | | | | 29/451 |
| 2016/0193988 | A1 * | 7/2016 | Plotzitzka | F16B 11/006 |
| | | | | 403/266 |
| 2018/0323597 | A1 * | 11/2018 | Joubeaux | F16B 5/0642 |

* cited by examiner

MULTI-MATERIAL RESTRAINER JOINT

FIELD

The present disclosure relates generally to fasteners and more particularly to fasteners for use in joining adjacent workpieces, wherein the workpieces may be different materials.

BACKGROUND

The statements in this section merely provide background information related to the present disclosure and may not constitute prior art.

A variety of materials are often joined together in applications such as automobiles, and more particularly an automotive body to its roof, and are configured to meet specific operational requirements and conditions. Automotive manufacturers are increasingly using advanced materials to reduce weight and thus increase fuel economy. These materials include aluminum, carbon fiber composites, and magnesium, among others. The tailored use of advanced materials for components being joined such as a roof can save significant mass over conventional all steel or all aluminum designs.

In an automotive build process, a finished body is treated to various temperature dependent coating processes, such as electro-coat (e-coat), and the painting process. The high temperatures of this process are also used to cure adhesives used in the vehicle. Materials such as steel and aluminum, and their specific geometric configuration within a part or assembly, will expand at elevated temperatures and at different rates. The "coefficient of thermal expansion" (CTE) is a metric that describes the percentage growth of an object as a function of temperature. The CTE of aluminum is significantly higher than that of steel, which is often much higher than composite materials. Therefore, when heat is applied to the vehicle, a steel part, such as a body side would expand less than an aluminum part, such as a roof panel. This can cause distortion in the final assembled geometry, which can then result in unacceptable fit to the vehicle body, as well as residual stresses.

Typical assembly configurations for automotive components include mechanical joints such as self-piercing rivets (SPRs) used in conjunction with an adhesive. During thermal processing, these mechanical joints may act as pins and restrict part movement, which can lead to yielding of one or more parts of an assembly as the different parts expand and contract at different rates. Using adhesive alone may not be acceptable in high volume production as the parts often are "geometry set" prior to entering paint ovens where the adhesive is cured and locked into place. This "geo-setting" process is used to establish good fit to the vehicle body.

These assembly issues, among other mechanical joining issues, are addressed by the present disclosure.

SUMMARY

In one form of the present disclosure, a fastener for use in joining workpieces is provided that comprises a plastically deformable head portion, a platform disposed at a bottom of the head portion, and a distal end portion extending from the platform and defining at least one of elastically deformable locking member.

According to other forms of this fastener, the distal end portion defines a conical geometry that tapers inwardly from the platform distally. In one form, a plurality of locking members defining tabs are arranged in a longitudinal stack and may further comprise sets of tabs that are diametrically opposed. These tabs define a length, and the length of the tabs progressively decreases towards the distal end portion in another form of the present disclosure. Alternately, a plurality of elastically deformable locking members are provided, each deformable locking member defining a ring extending around a periphery of the distal end portion.

In one form, the plastically deformable head portion, the platform, and the distal end portion define a single unitized part. The fastener may be any of a number of materials, including a nylon material. The material and geometry of the fastener may further be configured to compensate for a difference in thermal expansion of the workpieces being joined. In the pre-installed state, the platform is wider than the plastically deformable head portion and the distal end portion in another variant of the present disclosure.

In another form of the present disclosure, a fastener is provided that comprises a plastically deformable head portion, a platform disposed at a bottom of the head portion, a distal end portion extending from the platform, the distal end portion defining a conical geometry that tapers inwardly from the platform distally, and sets of elastically deformable tabs arranged in a longitudinal stack. The elastically deformable tabs are diametrically opposed, and a length of the tabs progressively decreases towards the distal end portion.

In still another form of the present disclosure, an assembly is provided that comprises a plurality of workpieces and a fastener disposed between the workpieces. The fastener comprises a plastically deformed head portion engaging one of the workpieces, a platform disposed at a bottom of the head portion, a distal end portion extending from the platform and defining at least one elastically deformable locking member engaged with another of the workpieces, and an adhesive material disposed between the workpieces and surrounding the platform of the fastener.

In various forms of this assembly, one of the workpieces is a steel material, and another of the workpieces is an aluminum material, and a material and geometry of the fastener are configured to compensate for a difference in thermal expansion between the steel and the aluminum materials. Alternately, the workpieces are the same material, and a material and geometry of the fastener are configured to compensate for a difference in thermal expansion between the workpieces. One workpiece may be a roof and another workpiece a body frame of a motor vehicle, for example, an automobile.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
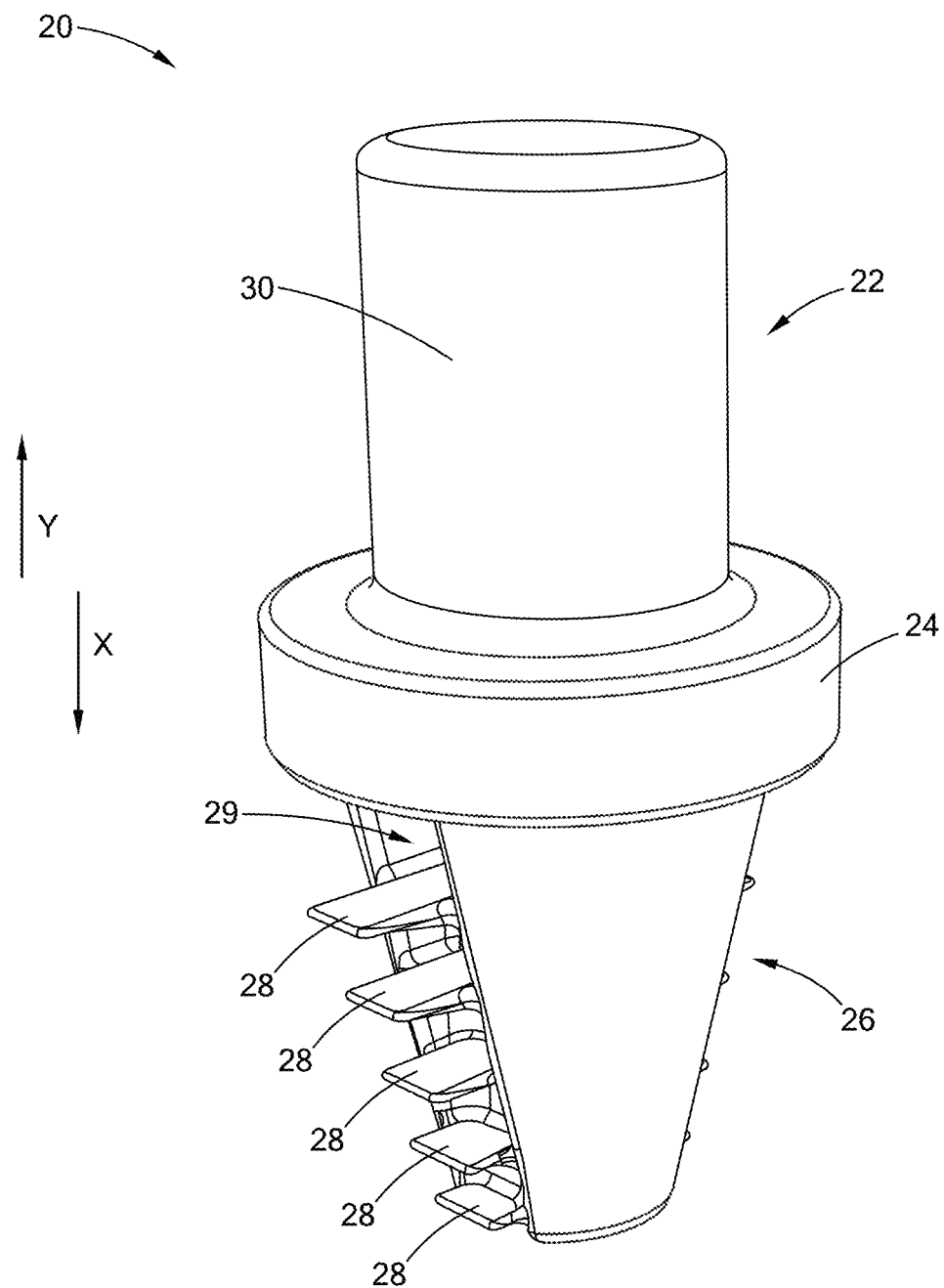
FIG. 1 is a perspective view of one form of a fastener before insertion, or in a pre-installed state, constructed in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
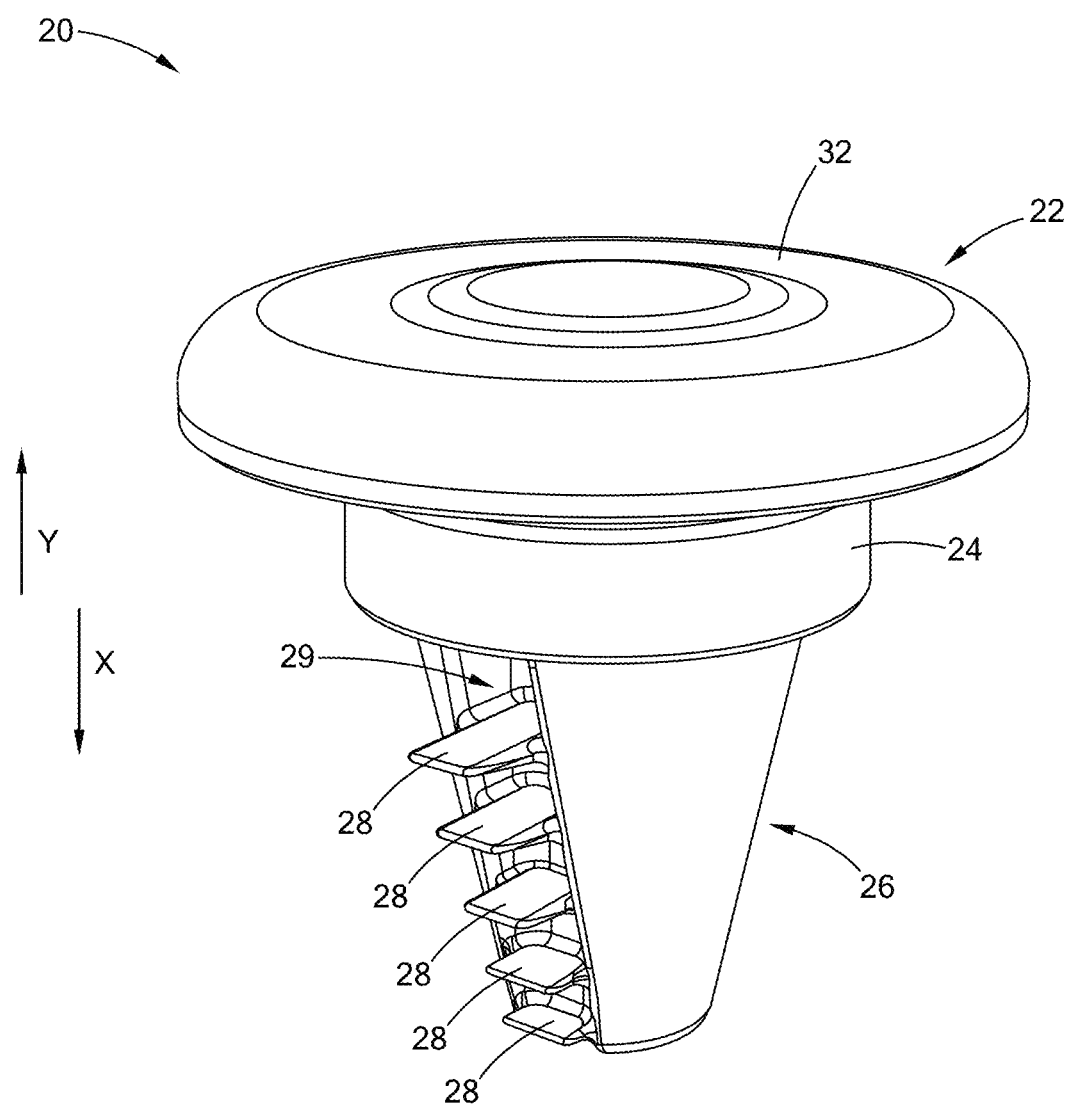
FIG. 2 is a perspective view of the fastener of FIG. 1 with a plastically deformed head portion after insertion, or in an installed state, in accordance with the principles of the present disclosure.
Figure 3A:
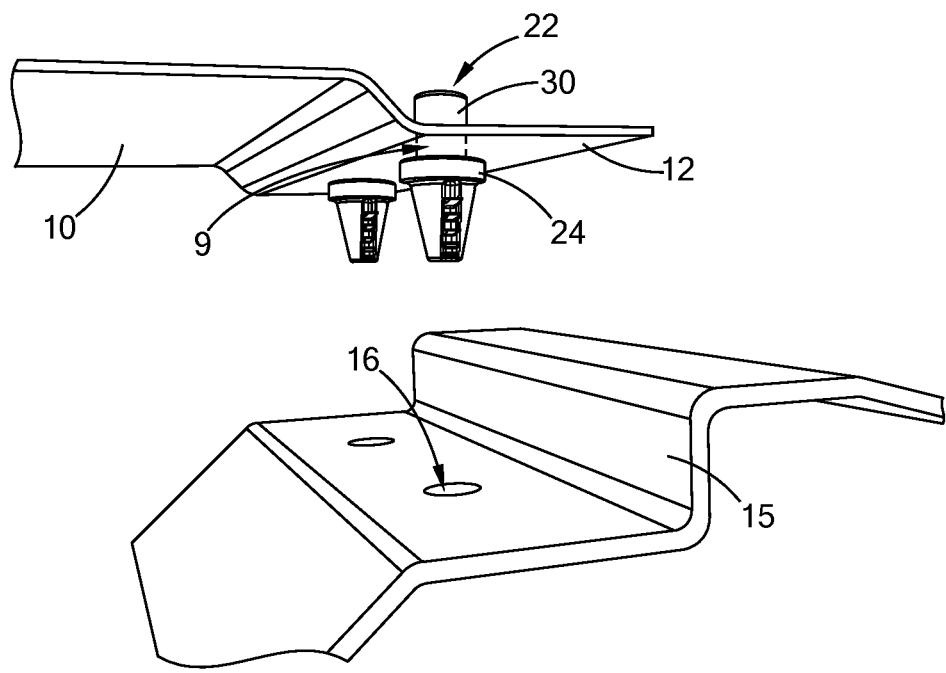
FIG. 3A is a perspective view illustrating the fastener of FIG. 1 disposed within a workpiece in preparation for installation according to the principles of the present disclosure.
Figure 3B:
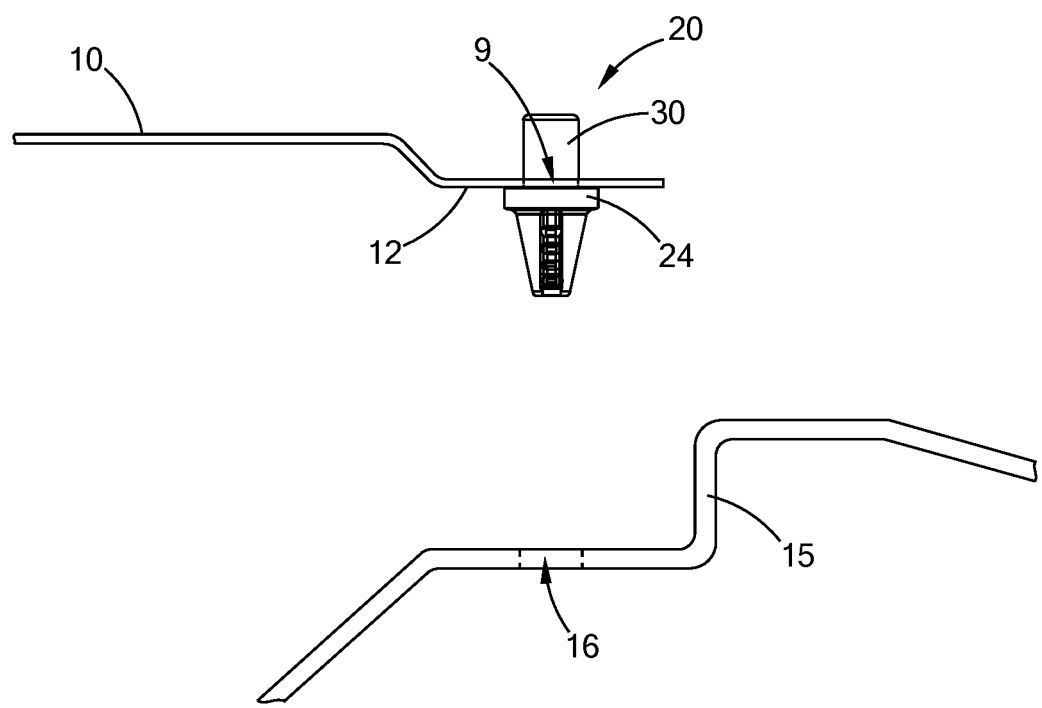
FIG. 3B is a side view of FIG. 3A.
Figure 4A:
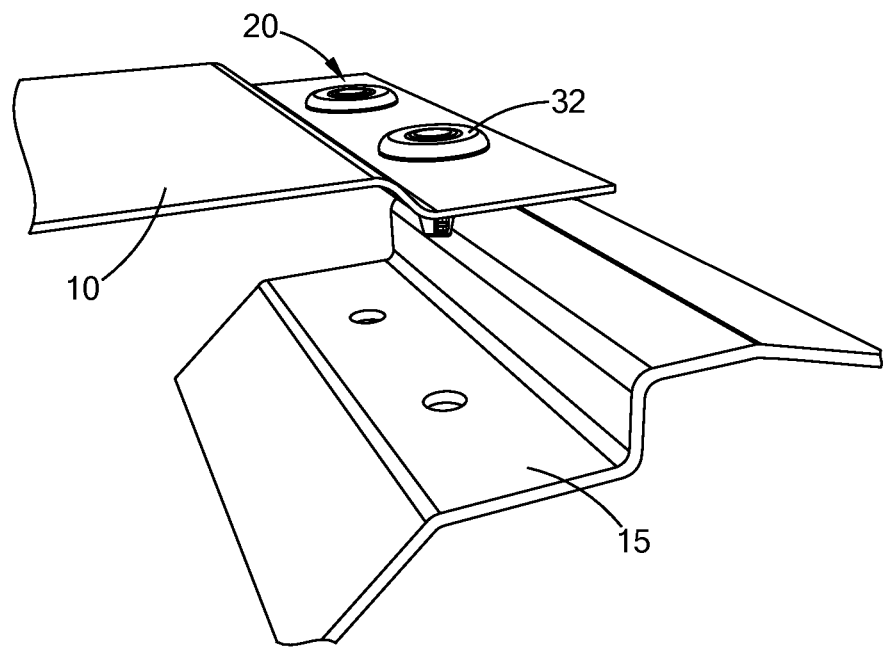
FIG. 4A is a perspective view illustrating the fastener of FIG. 1 installed within a workpiece according to the principles of the present disclosure.
Figure 4B:
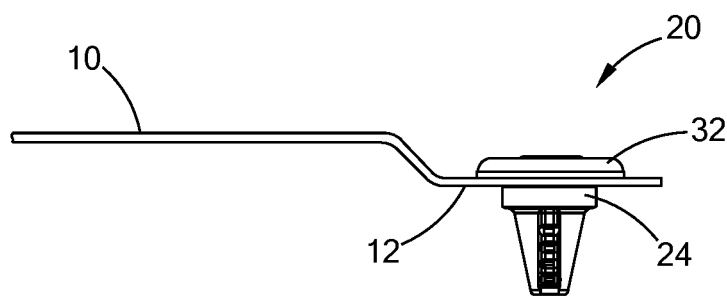
FIG. 4B is a side view of FIG. 4A.
Figure 4B:
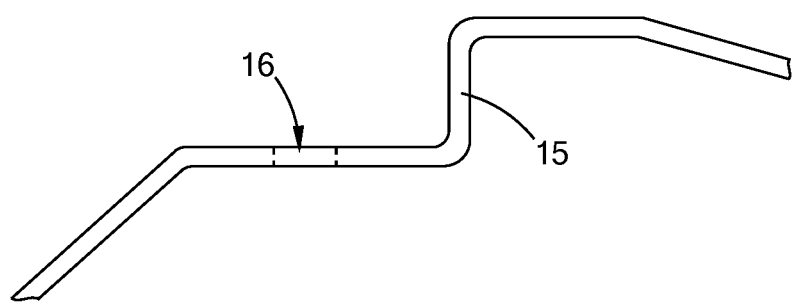

Referring to FIGS. 1 and 2, a fastener for use in joining workpieces and constructed according to the teachings of the present disclosure is illustrated and generally indicated by reference numeral 20. The fastener 20 includes a plastically deformable head portion 22, a platform 24 disposed at a bottom of the head portion 22, and a distal end portion 26 extending from the platform 24 and defining at least one of elastically deformable locking member. In this form, the elastically deformable locking member comprises a plurality of tabs 28 arranged in a longitudinal stack as shown. Further, the tabs 28 are in sets that are diametrically opposed in this form. Each of the tabs 28 defines a length, and the length of each tab 28 progressively decreases towards the distal end portion 26 as shown. Further, a corresponding plurality of pockets 29 are formed into the distal end portion 26 to allow for deflection of the tabs 28 during installation.

The distal end portion 26 of the fastener 20 in this form defines a conical geometry that tapers inwardly from the platform 24, distally. This conical geometry, along with the geometry of the tabs 28 and their progressively decreasing lengths facilitates insertion and installation across a variety of thicknesses of workpieces as described in greater detail below. As used herein, the term "distally" shall be construed to be in the direction of arrow X, and the term "proximally" shall be construed to be in the direction of arrow Y.

Referring also to FIGS. 3A-3B and 4A-4B, the head portion 22 is in the form of column or stub 30 in its pre-installed state. After the stub 30 is inserted through an aperture 9 in one workpiece 10, the platform 24 engages an inner surface 12 of the workpiece 10 for proper location, and then head portion 22 is heat staked, thus forming a button 32 in the installed state, which secures the fastener 20 to the workpiece 10. As shown, multiple fasteners 20 may be heat staked to the workpiece 10 prior to joining the workpiece 10 to another workpiece 15.

Figure 5A:
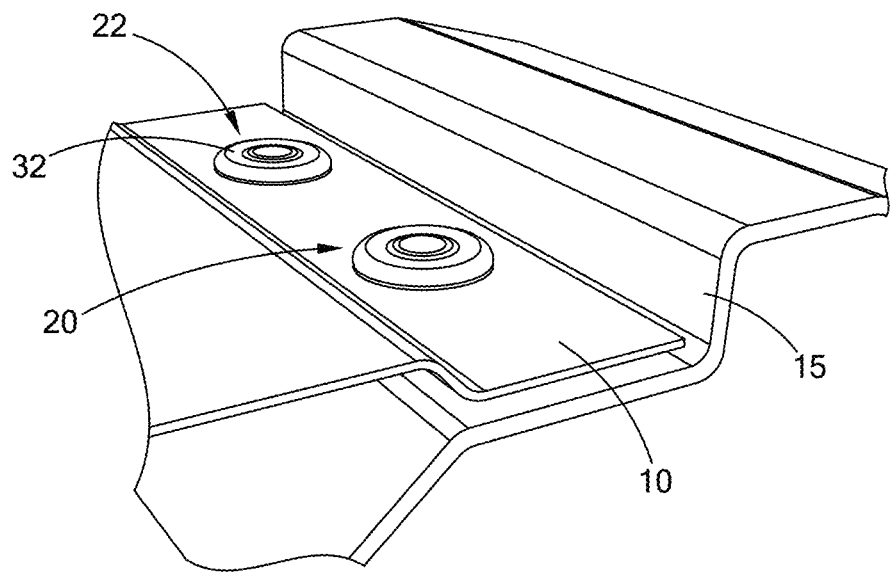
FIG. 5A is a perspective view illustrating the fastener of FIG. 1 fully installed within, and joining, two workpieces according to the principles of the present disclosure.
Figure 5B:
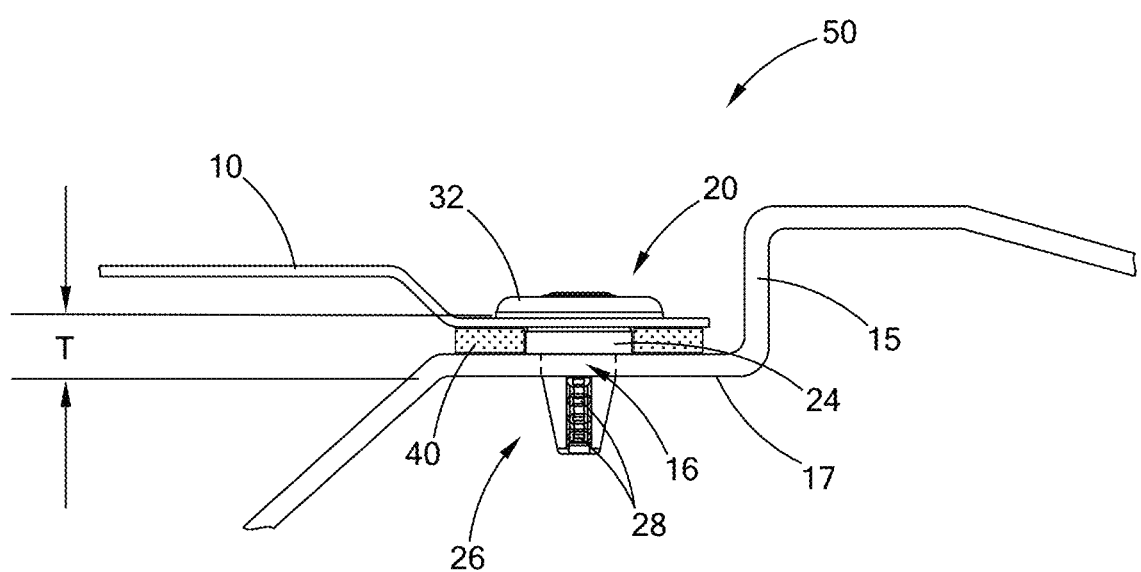
FIG. 5B is a side view of FIG. 5A.

Referring further to FIGS. 5A and 5B, after the head portion 22 is heat staked, the fastener(s) 20 installed in the workpiece 10 are brought near/proximate to the other workpiece 15. The distal end portion 26 of the fastener 20 is inserted through an aperture 16 (best shown in FIG. 4B) in the other workpiece 15, and the fastener 20 is pressed into the aperture 16, along with the elastically deformable tabs 28, until one of the elastically deformable tabs 28 engages an inner surface 17 of the workpiece 15 according to an overall thickness T of the assembled joint. If the overall thickness T was greater, an elastically deformable tab 28 more towards the distal end portion 26 of the fastener 20 would engage the inner surface 17, and vice-versa, if the overall thickness was smaller, an elastically deformable tab 28 more towards the platform 24 of the fastener 20 would engage the inner surface 17. Once a deformable tab 28 engages the inner surface 17 of the workpiece 15, the two workpieces 10/15 are secured together to form an assembly 50.

After the fasteners 20 are installed and the workpieces 10 and 15 are secured together, or at least before the fasteners 20 are inserted into the workpiece 10 after heat staking, an adhesive 40 may be applied between the workpieces 10/15 as shown. Accordingly, the platform 24 may have a predefined thickness to establish an adhesive thickness, or a bond gap, along the joint.

The material of the workpieces 10/15 may be the same, or they may be different, such as by way of example, workpiece 10 being steel and workpiece 15 being aluminum. Even if the materials of the workpieces 10/15 are the same, because their geometries are different, and because their processing conditions may be different, their respective amount of thermal expansion/contraction throughout various thermal processes will be different. This difference in thermal expansion/contraction can be characterized by a "thermal factor," which as used herein should be construed to convey an amount of thermal expansion/contraction per unit volume, time, and temperature, among other part, assembly, and environmental conditions. The assembly conditions may include, by way of example, location in a processing oven, air flow, and delivery temperature, among others. For example, a thin part made from aluminum would have a higher thermal factor than a thick part made from carbon composites. Therefore, the material and geometry of the fastener 20 are configured to compensate for a difference in thermal expansion between the workpieces 10/15. For example, the thickness of the platform 24 may be sized to accommodate differences in thermal factor. Further, the material of the fastener 20 itself may be tailored to the specific materials of the workpieces 10/15. In one form, the fastener 20 is a nylon material while the workpiece 10 is steel and the workpiece 15 is aluminum. It should be understood that a variety of materials and geometries for the fastener 20 may be employed depending on the thermal masses of the workpieces being joined, and thus the specific examples provided herein should not be construed as limiting the scope of the present disclosure.

The fastener 20 as illustrated herein is a single part, in which the plastically deformable head portion 22, the platform 24, and the distal end portion 26 define a single unitized part. It should be understood, however, that the fastener 20 may comprise a number of parts, for example, a separate washer in place of the integral platform 24 while remaining within the scope of the present disclosure. In these various forms, the platform 24, or a washer, is wider than the plastically deformable head portion 22 and the distal end portion 26 in the pre-installed state as shown in FIG. 1.

Figure 6:
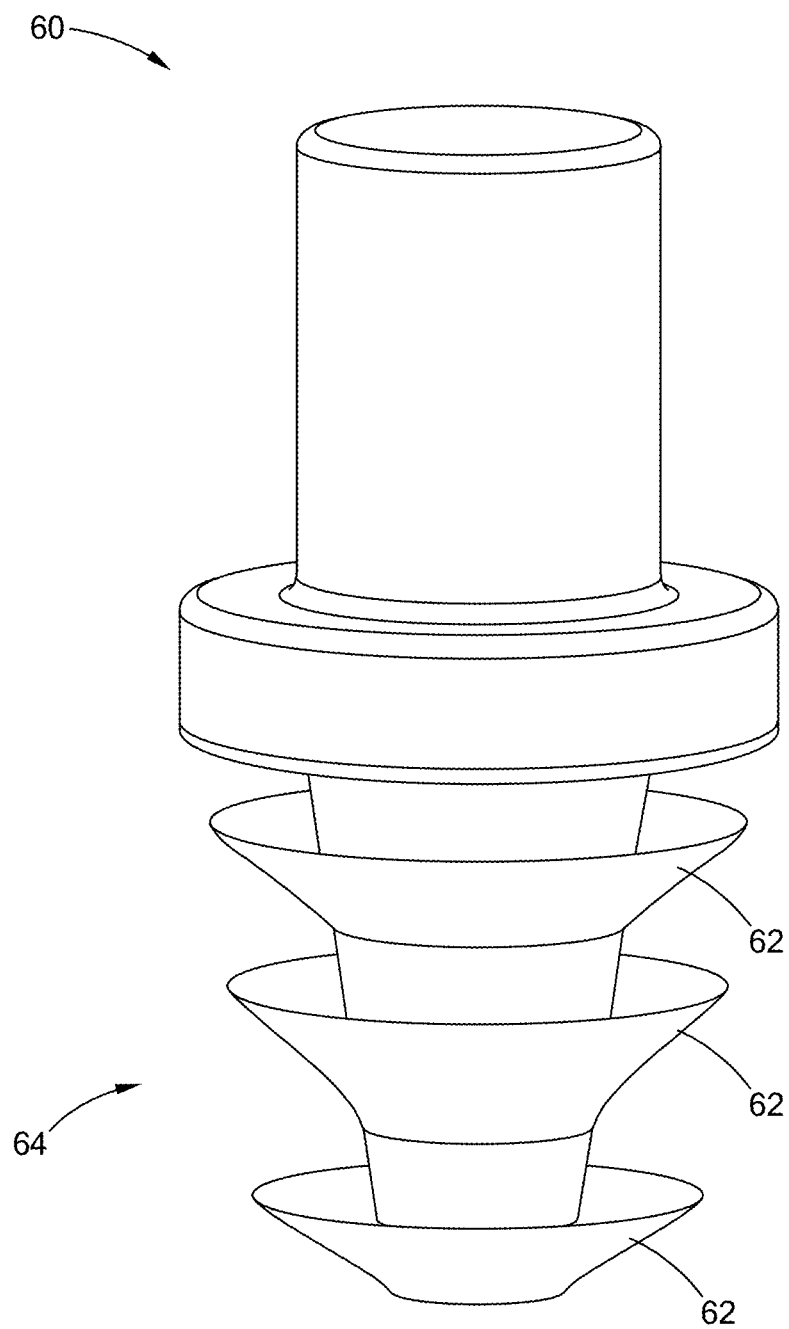
FIG. 6 is a perspective view of an alternate form of a fastener constructed in accordance with the principles of the present disclosure.

Referring now to FIG. 6, an alternate form of the elastically deformable locking members is illustrated in the fastener 60. In this form, each deformable locking member is a ring 62 extending around a periphery of the distal end portion 64. The rings 62 are progressively smaller towards the distal end portion 64 as shown, and each ring 62 functions similar to the tabs 28 as illustrated and described above, wherein a ring 62 that corresponds to an overall joint thickness between the workpieces engages an inner surface of one of the workpieces. These types of deformable locking members 62 in the form of a fastener are commonly referred to as "Christmas trees" in the industry. With the plurality of rings 62, a variety of joint thicknesses or grip lengths may be accommodated by a single fastener 60. It should be understood that other types of deformable locking members may be employed while remaining within the scope of the present disclosure, and thus the tabs 28 and rings 62 are merely exemplary and should not be construed as limiting the scope of the present disclosure.

According to the teachings of the present disclosure, an assembly is provided that can accommodate differences in thermal factor between workpieces being joined, such as a roof to a body frame, in a motor vehicle, such as an automobile. The present disclosure provides an innovative solution that joins a mixed material assembly (such as steel and aluminum), or the same material in an assembly having parts with different thermal factors with a restricting fastener. In an automotive application, the fastener 20 is used to geometry set a roof to a DOP (door opening panel) in a body shop prior to paint. As set forth above, the fastener 20 may be a polymer material compatible with the paint system and made from a material that will melt and soften (almost flow) from the paint ovens. Accordingly, the fastener 20 addresses issues that have been seen with joining similar or dissimilar materials as they are further thermally processed.

It should also be understood that the plastically deformable head portion 22 may take a variety of forms while remaining within the scope of the present disclosure. At least a portion of the deformable head portion 22 can be plastically deformable such that other forms of fasteners such as, by way of example, a conventional rivet or welded fastener on the top workpiece 10 may be employed while remaining within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A fastener for use in joining workpieces comprising:
a plastically deformable head portion;
a platform disposed at a bottom of the head portion; and
a distal end portion extending from the platform and defining at least one elastically deformable locking member,
wherein the plastically deformable head portion is in the form of a stub in a pre-installed state and extends directly from the platform, wherein the platform is wider than the plastically deformable head portion.

2. The fastener according to claim 1, wherein the distal end portion defines a conical geometry that tapers inwardly from the platform distally.

3. The fastener according to claim 1 further comprising a plurality of locking members defining tabs arranged in a longitudinal stack.

4. The fastener according to claim 3 further comprising sets of tabs that are diametrically opposed.

5. The fastener according to claim 3, wherein each of the tabs defines a length, and the length of the tabs progressively decreases towards the distal end portion.

6. The fastener according to claim 1 further comprising a plurality of elastically deformable locking members, each deformable locking member defining a ring extending around a periphery of the distal end portion.

7. The fastener according to claim 1, wherein the plastically deformable head portion, the platform, and the distal end portion define a single unitized part.

8. The fastener according to claim 1, wherein the fastener is a nylon material.

9. The fastener according to claim 1, wherein the platform is wider than the distal end portion.

10. The fastener according to claim 1, wherein the plastically deformable head portion is configured to be deformed into the form of a button in order to engage one of the workpieces.

11. A fastener comprising:
a plastically deformable head portion;
a platform disposed at a bottom of the head portion;
a distal end portion extending from the platform, the distal end portion defining a conical geometry that tapers inwardly from the platform distally; and
sets of elastically deformable tabs arranged in a longitudinal stack, the elastically deformable tabs being diametrically opposed, and a length of the tabs progressively decreasing towards the distal end portion,
wherein the plastically deformable head portion is in the form of a stub which extends directly from the platform, wherein the platform is wider than the plastically deformable head portion.

12. The fastener according to claim 11, wherein the fastener is a nylon material.

13. The fastener according to claim 11, wherein the plastically deformable head portion is configured to be deformed into the form of a button in order to engage one of the workpieces.

14. An assembly comprising:
a plurality of workpieces; and
a fastener disposed between the workpieces comprising:
a plastically deformed head portion engaging one of the workpieces;
a platform disposed at a bottom of the head portion; and
a distal end portion extending from the platform and defining at least one elastically deformable locking member engaged with another of the workpieces.

15. The assembly according to claim 14 further comprising an adhesive material disposed between the workpieces and surrounding the platform of the fastener, and wherein one of the workpieces is a steel material, and another of the workpieces is an aluminum material.

16. The assembly according to claim 14 further comprising an adhesive material disposed between the workpieces and surrounding the platform of the fastener, and wherein the workpieces are the same material.

17. The assembly according to claim 14, wherein the distal end portion of the fastener defines a conical geometry that tapers inwardly from the platform distally.

18. The assembly according to claim 14, wherein the fastener further comprises a plurality of locking members defining tabs arranged in a longitudinal stack.

19. The assembly according to claim 18 further comprising sets of tabs that are diametrically opposed.

20. A motor vehicle comprising the assembly according to claim 14.

* * * * *